Nov. 27, 1945.  B. BAXTER ET AL  2,389,887

VALVE UNIT

Filed Jan. 31, 1944

INVENTORS
Benj. Baxter
S. M. Kandarian
BY
ATTYS

Patented Nov. 27, 1945

2,389,887

UNITED STATES PATENT OFFICE 2,389,887

VALVE UNIT

Benjamin Baxter and Samuel M. Kandarian, Fowler, Calif.

Application January 31, 1944, Serial No. 520,450

1 Claim. (Cl. 137—152)

This invention relates in general to, and it is an object to provide, an improved valve unit operative to function as an automatic, pressure surge or shock absorber between the high pressure supply tank and pressure regulator in gas welding systems; the present invention comprising a modification of the valve unit shown in copending U. S. patent application, Serial No. 476,740, filed February 22, 1943, which matured into Patent No. 2,367,662, January 23, 1945.

Another object of this invention is to provide a valve unit of the type and for the purpose described, which is so designed that the pressure actuated valve responds faster to a pressure surge than the valve shown in the identified copending application, thus further minimizing the possibility of any substantial amount of surge pressure passing the valve unit and possibly damaging the pressure regulator.

A further object of the present invention is to provide novel means to secure the bleed control screw in the bleed passage which extends through the valve, whereby to prevent the screw from loosening, while at the same time allowing controlled and limited bleeding of pressure through said passage.

It is also an object to introduce a filter device into the valve unit in position to prevent access of any foreign substance to the bleed screw and adjacent intake end of the bleed passage.

A further object of the invention is to produce a simple and inexpensive device, and yet one which will be exceedingly effective for the purpose for which it is designed.

These objects we accomplish by means of such structure and relative arrangement of parts as will fully appear by a perusal of the following specification and claim.

In the drawing similar characters of reference indicate corresponding parts in the several views.

Figure 1:
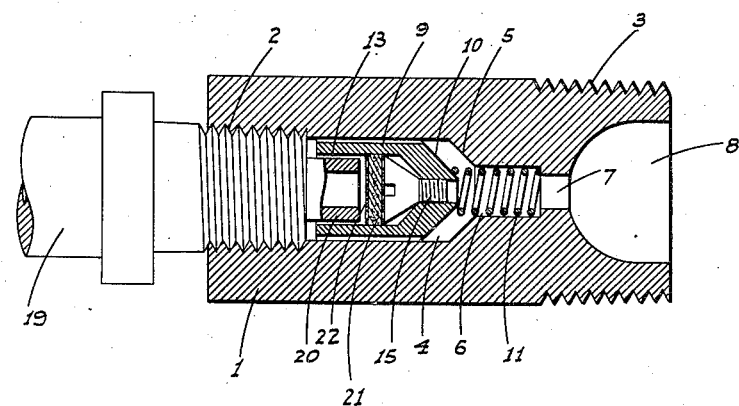
Figure 1 is a sectional elevation of the improved valve unit.
Figure 2:
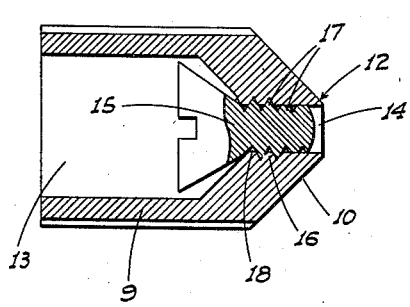
Figure 2 is an enlarged sectional elevation of the plunger valve and bleed control screw assembly.
Figure 3:
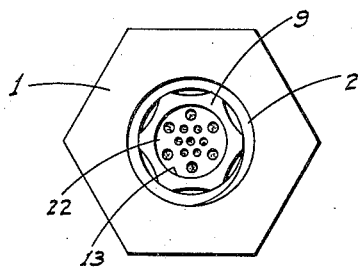
Figure 3 is an end view of the valve unit, taken from the intake end and with the corresponding nipple or coupling removed.
Figure 4:
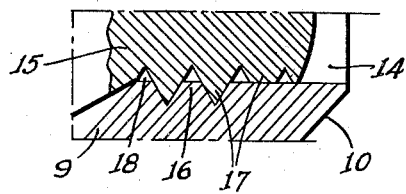
Figure 4 is an enlarged fragmentary section of the tapped valve bore with the screw engaged therein.

Referring now more particularly to the characters of reference on the drawing, the improved valve unit comprises an elongated body 1 which is bored and tapped at one end portion to form a female fitting 2; the opposite end portion of the body being threaded to form a male fitting 3.

Between the fittings 2 and 3 the body includes an axial bore 4 of substantial diameter; such bore being open at one end to the fitting 2, and provided at the opposite end with an annular, tapered valve seat 5 which opens into a reduced diameter bore or open ended socket 6. At the end opposite seat 5, the socket 6 communicates with a smaller diameter bore 7 which in turn opens into the fitting 3 which includes an internal chamber 8.

A longitudinally fluted plug valve 9 is slidably disposed in bore 4 and is tapered at one end as at 10 for matching and closing engagement with seat 5. A helical compression spring is seated in socket 6 and engages the nose 12 of the valve 9, such spring normally holding the valve in open position so that relative free flow of gas about the valve and past the seat 5 may occur.

The valve 9 is formed with a relatively deep concavity or socket 13 which opens axially toward the female fitting 2, and a small diameter axial bleed passage 14 extends from the socket 13 through the nose 12 of the valve.

A short, taper headed bleed control screw 15 is threaded into passage 14 from within socket 13. This bleed control screw is locked in passage 14, while at the same time allowing a limited or controlled bleeding of pressure therepast, by means of the following arrangement:

The bleed passage 14, prior to tapping, is first drilled slightly oversize for the tap to be used, and the end portion of said passage adjacent socket 13 is then tapped, as at 16, but with a lesser number of threads than the number of threads 17 on screw 15. Thus, when the screw 15 is threaded into place the inner end threads thereof, passing beyond the tapped threads and engaging in the untapped bore, will be deformed to effectively lock the screw against accidental rotation. Also, as the bleed passage 14 was drilled oversize, a certain slight clearance 18 is left between the cooperating threads on the screw and the threads in the bleed passage, permitting fluid pressure to bleed along the screw, as will hereinafter appear.

A nipple 19 is threaded into fitting 2 and includes an inwardly and axially extending tubular stem 20 of reduced diameter which projects into socket 13 in relatively close but spaced relation thereto. A circular filter pad 21 faced with perforate discs 22 may be interposed in socket 13 between stem 20 and screw 15 to prevent access of any foreign substance to said screw and the bleed passage.

Operation

In operation the above described valve unit is interposed in the conduit of a gas welding system between the gas supply tank and pressure regulator, as shown in the identified copending application; the nipple 19 being connected with the portion of the supply conduit leading from the tank.

Upon occurrence of a pressure surge ahead of the regulator (not shown) of the welding system, as when the tank valve is first opened, such surge is initially and momentarily entrapped in socket 13 between stem 20 and screw 15, causing valve 9 to close against seat 5, whereby such pressure surge does not reach the regulator, with possible resultant damage.

Thereafter, the pressure slowly bleeds along screw 15 and after a certain time the pressure in socket 13 and chamber 8 will equalize, whereupon valve 9 is automatically opened by spring 11 and the welding system may function in a conventional manner. When valve 9 is open, the fluid pressure feeds from stem 20 between the latter and the wall of socket 13 back to the open end thereof, and thence flows along the fluted outside of the valve and through seat 5.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A fluid pressure shock absorbing valve unit comprising a body having a bore therethrough, a pressure responsive plug valve slidable in said bore, a seat in the bore against which the valve is adapted to close, yieldable means normally holding the valve open relative to said seat, the valve when open permitting free flow therepast, and restricted passage means to bleed fluid through the valve when the latter is closed, said last named means comprising a bore through the valve, and a screw threaded into one end portion of the valve bore, said one end portion of said valve bore having with a less number of threads than the screw and the internal diameter of said bore being slightly oversize with respect to said bore threads, whereby when the screw is threaded into the valve bore a slight clearance remains between the cooperating threads on the screw and said bore threads, and the inner end threads of the screw pass beyond the corresponding end of said bore threads and deform in the adjacent unthreaded portion of the valve bore, locking said screw in place.

BENJAMIN BAXTER.
SAMUEL M. KANDARIAN.